May 18, 1926.
R. HOLMAN
1,584,745
AUTOMATIC CUP BLANK FEED ATTACHMENT FOR CUP FORMING MACHINES
Filed Nov. 13, 1922    7 Sheets-Sheet 1
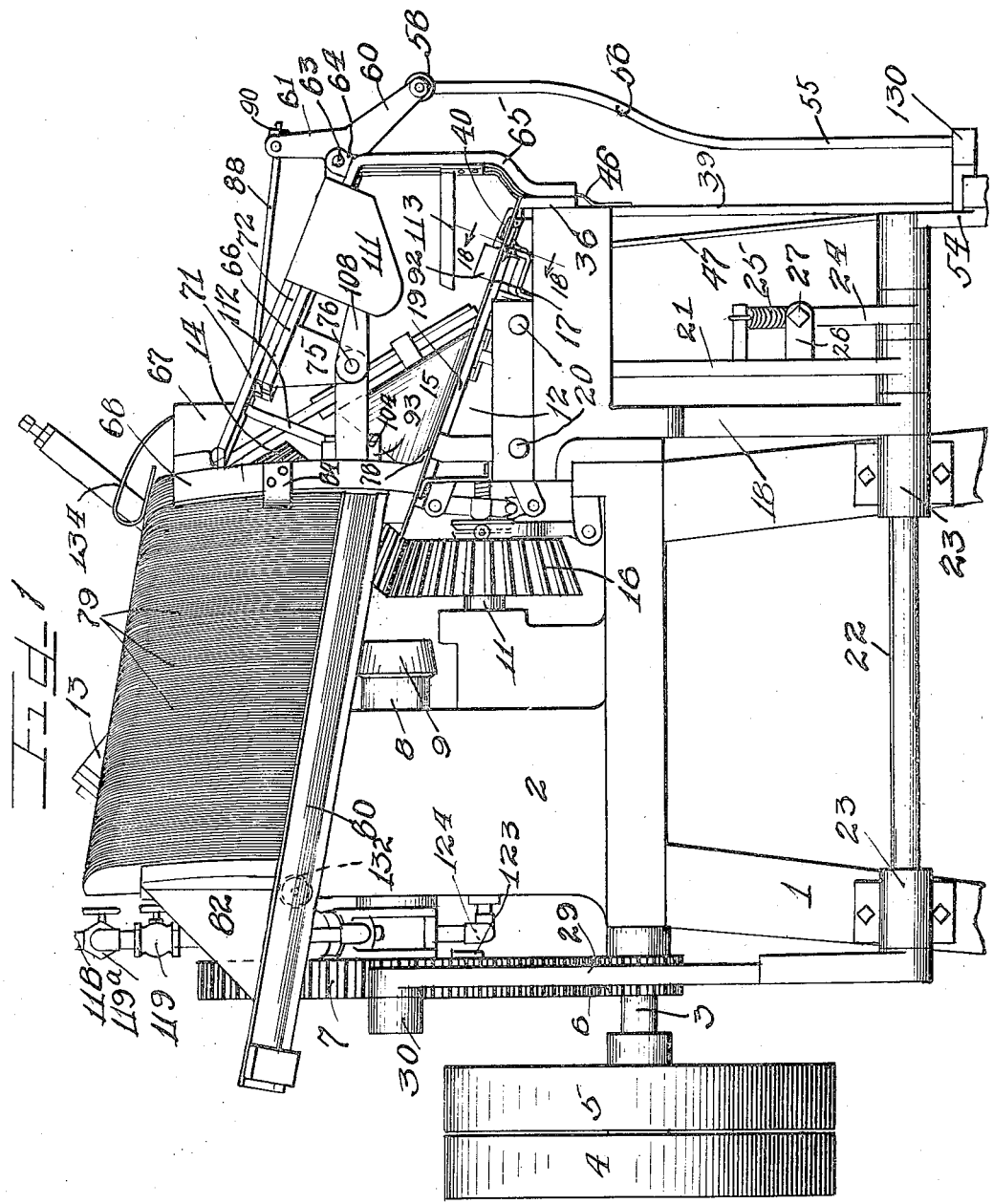

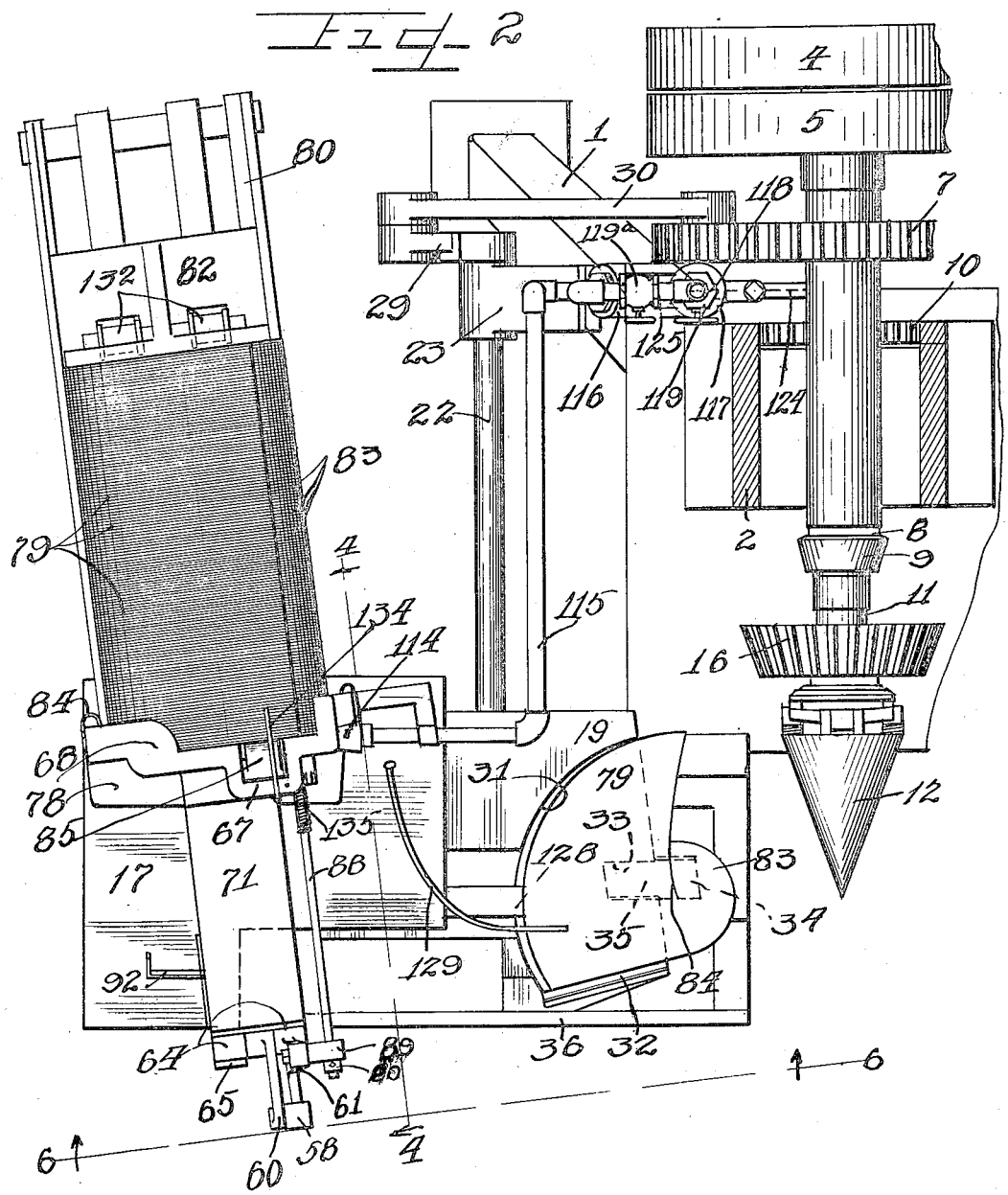

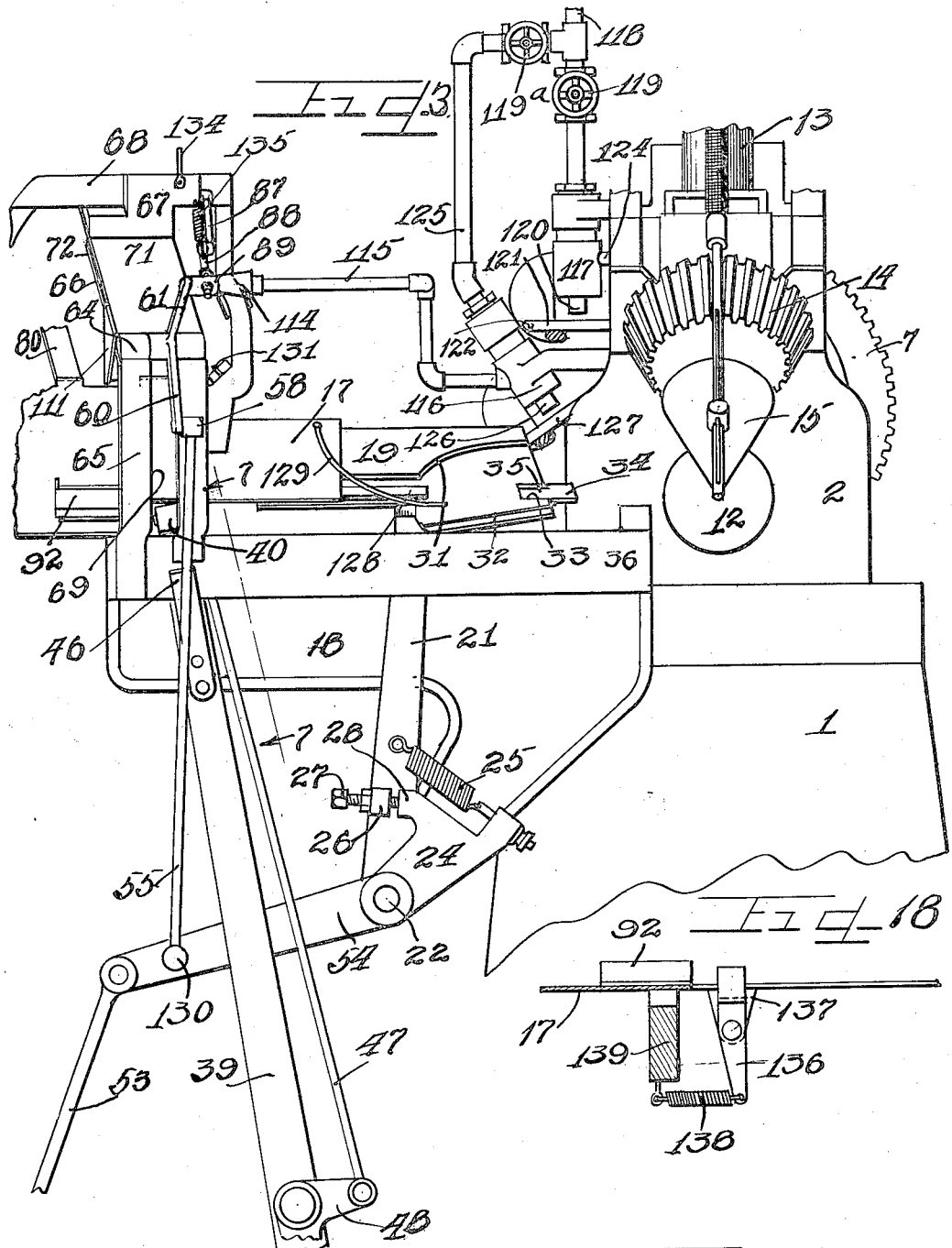

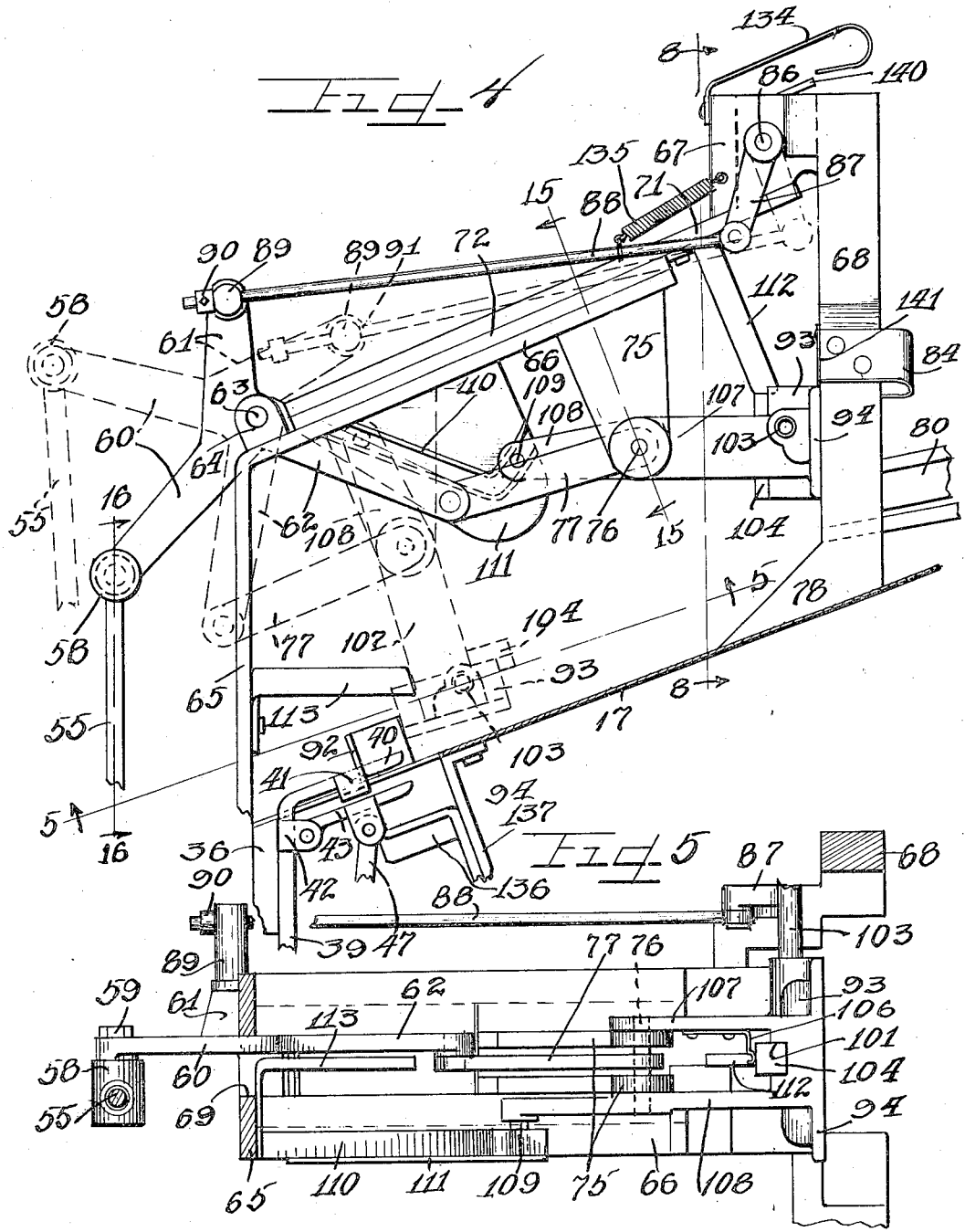

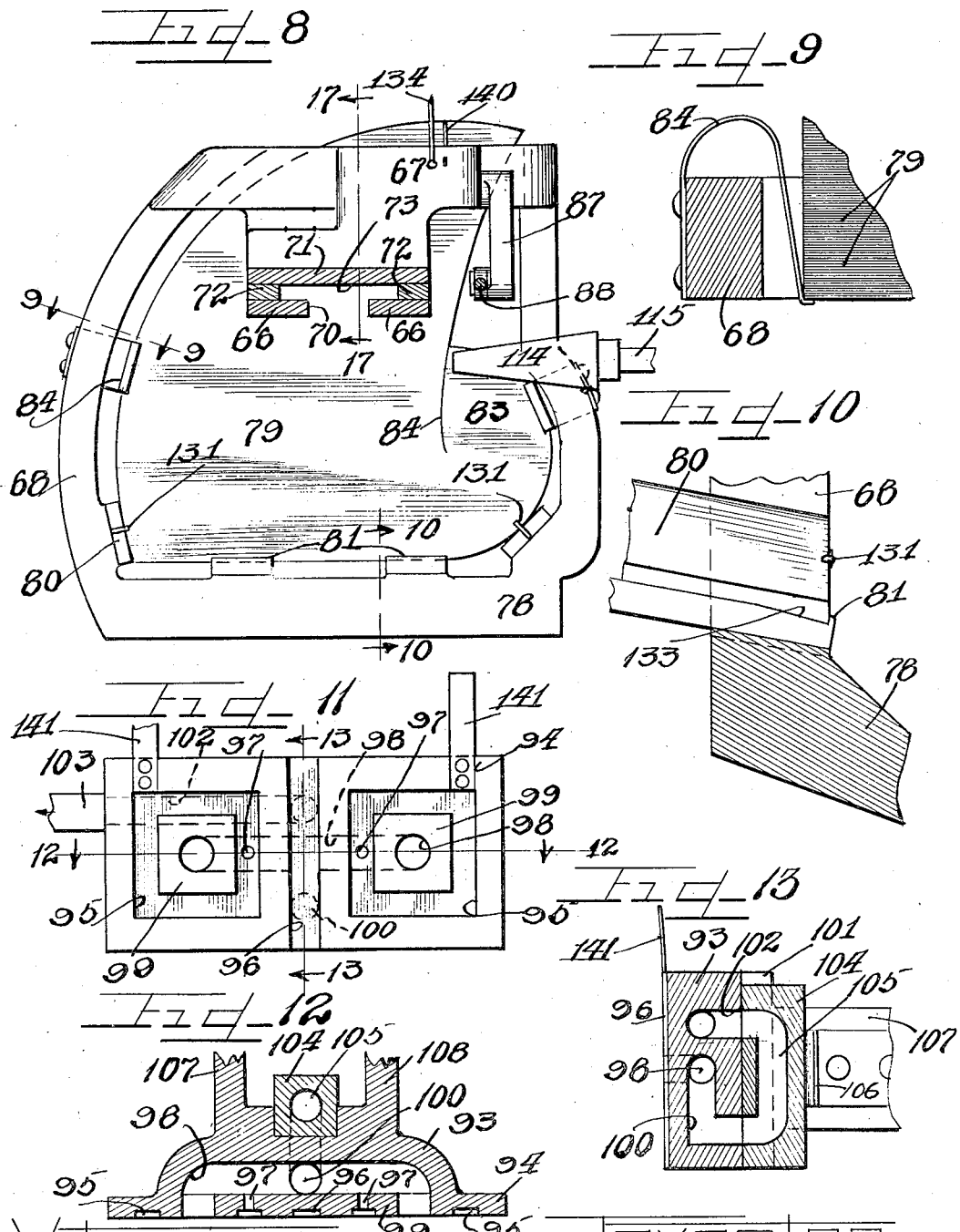

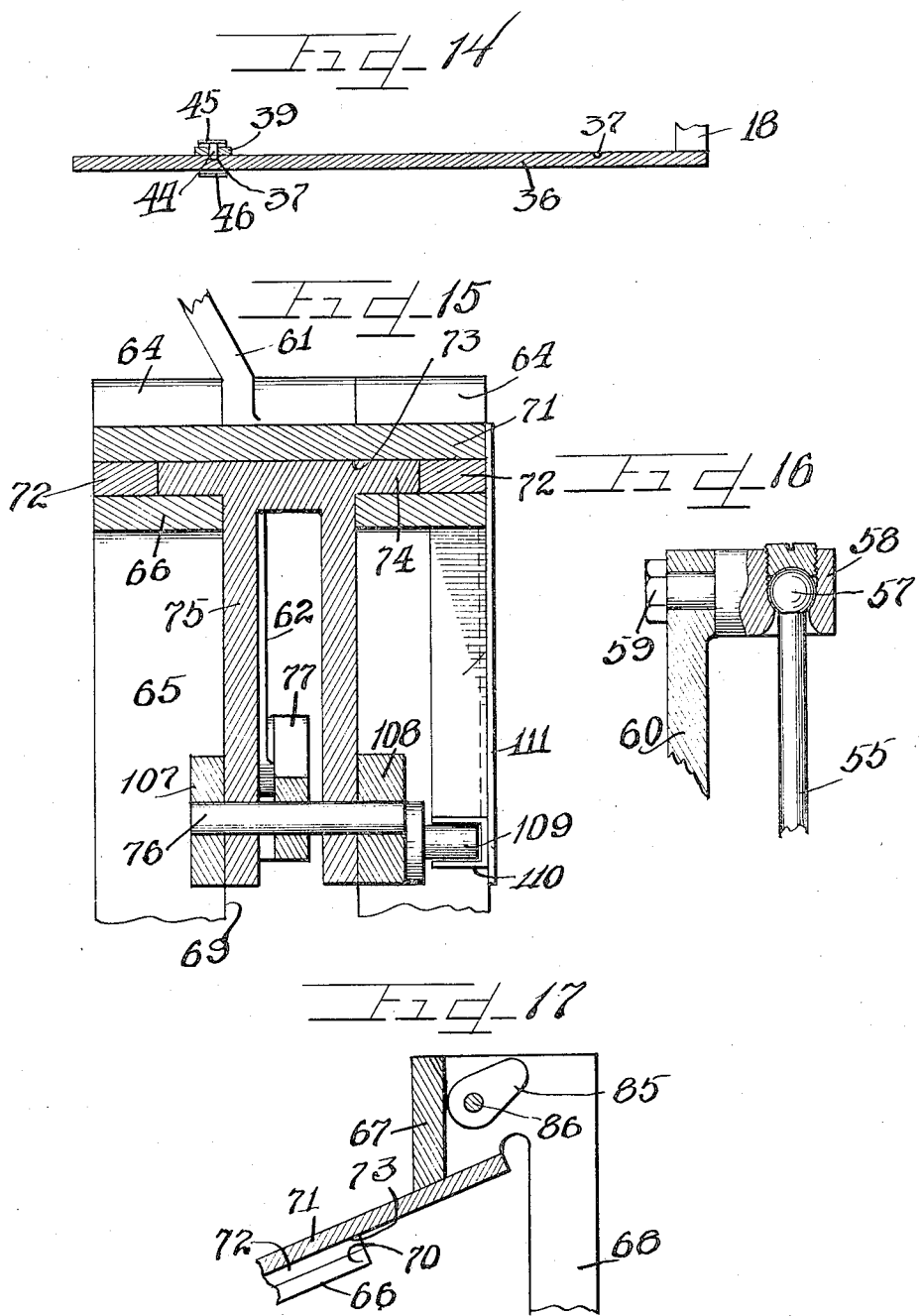

Patented May 18, 1926.

1,584,745

UNITED STATES PATENT OFFICE.

RUDOLPH HOLMAN, OF CHICAGO, ILLINOIS, ASSIGNOR TO THE VORTEX MFG. CO., A CORPORATION OF ILLINOIS.

AUTOMATIC CUP-BLANK-FEED ATTACHMENT FOR CUP-FORMING MACHINES.

Application filed November 13, 1922. Serial No. 600,623.

This invention relates to paper cup forming machines and more particularly to an attachment for cup forming machines adapted to automatically remove properly formed paper cup blanks individually from a gravity feed rack or chute by suction means into a position from which the removed blank is adapted to be automatically transferred across a reciprocating feed table and into a pocket therein whereby the blank is delivered into the field of operation of forming dies to be formed into a cup.

It is an object of this invention to provide an automatic cup blank feeding attachment for use on automatic paper cup forming machines.

Another object of the invention is to provide an attachment for a cup forming machine whereby a stack of cup blanks is adapted to automatically feed downwardly by gravity each time a blank is automatically removed from the end of the stack by a suction mechanism adapted to deliver the removed blank into a position to permit the same to be advanced into the cup forming machine.

It is also an object of the invention to provide a suction mechanism for removing cup blanks from a gravity feed stack and delivering the same into the field of operation of a transfer mechanism which acts to deliver the blank between cup forming rolls or dies.

It is a further object of the invention to provide a cup forming machine with a mechanism adapted to separate a cup blank by means of an air blast from the lower end of a gravity feed stack as said blank is buckled and removed by a suction apparatus which delivers the blank against stops upon a stationary table from which it is adapted to be delivered onto a reciprocating table and fed into the cup forming machine.

It is furthermore an object of this invention to provide a cup forming machine with a blank feed mechanism adapted to first remove a blank by suction means from the lower end of a gravity feed stack and with the same operation transfer the removed blank to an inclined table and release the blank to permit the same to be automatically removed by a gripping device and transferred onto a reciprocating feed table provided with centering stops to hold the blank in proper position to be delivered into the field of operation of cup forming dies constituting part of the machine.

It is still a further object of the invention to provide a cup forming machine with a blank feed attachment wherein weighted blanks having reinforcing tabs are adapted to be advanced by gravity into a frame from which the lowermost blank is adapted to be automatically removed by a suction mechanism assisted by a buckling device and an air blast mechanism which acts to assaist in separating the lowermost blank from an adjacent blank to permit the entire blank to be transferred to a stationary support and engaged by a gripping device to permit the blank to be transferred onto a reciprocating feed table of the machine.

It is also an object of the invention to provide a blank feed attachment for a cup forming machine, said attachment being operable from the machine which actuates a three arm crank controlling a blank buckling mechanism and a suction device the valve of which is operated by stationary members, against which the valve is engaged when said suction device is actuated by the crank.

It is a further object of the invention to provide a cup forming machine with a blank feed device wherein blanks are adapted to be fed by gravity into a blank centering frame to be removed by suction means and then delivered into the field of operation of gripping members to permit the blank to be transferred to reciprocating feed table forming part of the machine.

It is an important object of this invention to provide an automatic blank feeding mechanism for a cup forming machine, operable by the machine and timed to coact with the cup forming members of the machine.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary front elevation of a paper cup forming machine equipped with a cup blank feed attachment embodying the principles of this invention.

Figure 2 is a fragmentary top plan view of the machine with parts omitted to disclose the feed attachment.

Figure 3 is a fragmentary end elevation of the machine looking toward the forming cones.

Figure 4 is an enlarged fragmentary detail view taken on line 4—4 of Figure 2 showing the operation in dotted lines.

Figure 5 is a bottom plan view taken on line 5—5 of Figure 4 with parts omitted.

Figure 6 is a fragmentary detail elevation taken on line 6—6 of Figure 2.

Figure 7 is an enlarged fragmentary detail view taken on line 7—7 of Figure 3 with parts omitted.

Figure 8 is a vertical detail view taken on line 8—8 of Figure 4 with parts omitted.

Figure 9 is an enlarged fragmentary detail section taken on line 9—9 of Figure 8.

Figure 10 is an enlarged fragmentary detail section taken on line 10—10 of Figure 8.

Figure 11 is an enlarged detail face view of the suction blank transfer mechanism.

Figure 12 is a fragmentary detail section taken on line 12—12 of Figure 11.

Figure 13 is a transverse section taken on line 13—13 of Figure 11.

Figure 14 is a detail section taken on line 14—14 of Figure 6.

Figure 15 is an enlarged detail section taken on line 15—15 of Figure 4.

Figure 16 is an enlarged detail section, partly in elevation, taken on line 16—16 of Figure 4.

Figure 17 is a fragmentary detail section taken on line 17—17 of Figure 8.

Figure 18 is an enlarged fragmentary detail sectional view taken on line 18—18 of Figure 1.

As shown on the drawings:

The paper cup forming machine illustrated in the drawings and hereinafter described is similar in construction and operation to the paper cup forming machine shown and described in the co-pending application for patent of Cesare Barbieri for an "automatic cup forming machine", filed October 28th, 1918, Serial No. 259,986, the entire right, title and interest in which has been assigned to The Vortex Mfg. Co., of Chicago, Illinois, to whom this application has also been assigned.

The cup forming machine comprises a machine frame 1 having supported thereon a head 2. Mounted in suitable bearings in the machine head 2 is a main driving shaft 3 having supported thereon an idler pulley 4 positioned adjacent a pulley 5 secured to said shaft to permit a drive to be transmitted to said shaft from any suitable source of power. Secured on the driving shaft 3 is a driving gear 6 meshing with a large gear 7 supported on a shaft 8 engaged in bearings in the machine frame head 2. A cam 9 is secured on the inner end of the shaft 8. Also fixed on the main driving shaft 3 is a gear 10 (Figure 2) which meshes with a gear fixed on a shaft 11 on one end of which a main cup forming cone or die 12 is supported. The cam 9 coacts with a sleeve 13 which is pivoted on the machine frame head 2 and affords a bearing for a shaft supporting a beveled gear 14 and a cup pressing cone or die 15. The beveled gear 14 meshes at all times with a beveled gear 16 supported on the shaft 11.

The cup forming machine has attached thereto automatic cup blank feed and transfer mechanisms which cover this invention. A stationary inclined table 17 is rigidly mounted upon a bracket 18 secured on the machine frame 1. An inclined slide table 19 is mounted beneath the stationary table 17 upon suitable guides 20, the ends of which are supported on the bracket 18. An arm or lever 21 is pivotally mounted on a shaft 22 supported in bearings 23 secured to the machine frame. The upper end of the lever 21 is pivotally connected with the slide table 19 so that each oscillation of said lever 21 will cause a corresponding longitudinal movement of the slide table 19 substantially in the plane of the meeting surfaces of the cup forming dies 12 and 15 of the cup forming machine.

The means for oscillating the lever 21 comprises a plate or arm 24 mounted upon the pivot shaft 22 with the free end of said arm 24 connected by a spring 25 to the lever 21. A boss 26 on the lever 21 is provided with an adjustable screw 27 which extends through the boss and is adapted to normally contact an extension 28 on the arm 24. The spring 25 acts to resiliently hold the screw 27 in contact with the extension 28 of the arm 24. Secured to the shaft 22 is a crank arm 29 to the upper end of which is pivotally connected one end of a link 30, the other end of which is pivotally connected to a crank pin on the gear 7 to receive a drive therefrom.

The shiftable table 19 is provided with a blank receiving recess 31 and with a blank guide flange 32. A notch 33 is provided in the shiftable table 19 to permit the shiftable table 19 to engage an upturned or deflected portion 34 of a blank supporting bar 35 when the table 19 is in its advanced feeding position. The bar 35 is slidably mounted on the under side of the table 19 and is adapted to be advanced therewith. The bar 35 serves to hold the advance portions of the cup blanks in an elevated position as the shiftable table 19 is advanced. The bar 35 is, however, arrested in its forward movement by contact with a stationary stop before said bar reaches the forming dies 12 and 15, while the table 19 continues its advance to feed a blank thereon between the forming dies.

Fixed at the under side of the stationary table 17 and projecting out over the top of the slidable table 19 is a blank stop bar 128. Mounted upon the stationary table 17 is a blank retaining spring 129 beneath which the cup blanks slide when being advanced onto the slidable table 19.

Fixed on the machine frame bracket 18 is a horizontal beam or bar 36 having indents or notches 37 at spaced intervals on the inner side thereof (Figure 14). Secured to the lower portion of the machine frame 1 is a bracket 38 to which the lower end of a reciprocating lever 39 is pivoted. The upper end of the lever 39 projects upwardly behind the bar 36 and has the end portion thereof bent to provide an inclined upper gripper member or gripping finger 40. A lug 41 is integrally formed on one side of the gripper 40. Also formed on the upper portion of the lever 39 is an extension or arm 42 on which a lower blank grip or finger 43 is pivotally supported beneath the upper grip 40 (Figure 7). Projecting through an opening in the upper part of the lever 39 is a ball or pin 44 held in place against the bar 36 by means of a leaf spring 45 fastened to the inner side of the lever 39. A friction guide spring 46 is secured on the outer side of the lever 39 and presses against the outer side of the bar 36. Pivotally connected to the pivoted gripper 43 is the upper end of a gripper actuating rod 47. The lower end of the rod 47 is pivotally connected to one arm of a bell crank 48 which is pivotally mounted on the lever 39. A stop pin 49 is fixed on the lever 39 to limit the throw of the bell crank 48 in one direction. Pivoted to the other arm of the bell crank 48 is one end of a toggle bar or link 50, the other end of which is pivoted on a pin 51. The pin 51 has also pivotally engaged thereon one end of a toggle bar or link 52, the other end of which is pivoted on the lever 39 below the bell crank 48. The pin 51 is supported in the lower end of a connecting rod 53. The upper end of said rod 53 is pivotally connected to the outer end of an arm or lever 54 fixed on the shaft 22, as shown in Figure 6.

Pivoted by means of a ball and socket joint at 130 to the lever 54 intermediate its ends is the lower end of an actuating rod 55 for operating the blank feed mechanism and the blank buckling mechanism. The rod 55 is deflected at 56 and has a ball 57 fixed on the upper end thereof and forming part of a ball and socket or universal joint. The ball 57 is engaged in a socket 58 (Figure 16) supported by means of a bolt 59 on the end of an arm 60 which comprises one of the arms of a triple arm bell crank member having additional arms 61 and 62. The three arms of the triple bell crank member are disposed approximately one hundred and twenty degrees apart, as illustrated in Figure 4.

The triple arm bell crank member is pivotally supported on a pin 63 engaged in bearings 64 formed on a stationary support comprising a vertical arm 65 and an upwardly inclined arm 66. The support arm 65 is rigidly secured to the stationary horizontal bar 36. The support arm 65 is provided with a slot 69 to permit operation of the triple arm bell crank. The support arm 66 is provided with a longitudinal slot 70 (Figure 8). Mounted above the inclined slotted support arm 66 and secured to the hood 67 of a frame 68 is a plate 71 separated from said arm 66 by spacer bars 72. The spacer bars 72, together with the members 66 and 71, afford a T-guide slot 73.

Slidably engaged in the T-slot 73 is the head 74 of a double arm carriage 75 supporting a cross pin 76. Pivoted on the cross pin 76 between the arms of the carriage 75 is one end of a link 77, the other end of which is pivotally connected to the bell crank arm 62. The foot 78 of the blank centering frame 68 is supported on the stationary blank receiving table 17. A magazine for holding a stack of properly formed cup blanks 79 is provided on the machine and comprises an inclined guideway or chute 80, the lower end of which is supported on the blank centering frame 68. Stop beads 81 are formed at the lower ends of two of the longitudinal slats or bars forming the chute 80. Wire stops 131 are provided on the lower ends of the side bars of the chute 80. A weighted follower or block 82 is engaged in the chute 80 behind the stack of blanks 79 to cause said blanks to slide downwardly in said chute by gravity each time a blank is removed from the lower end of the stack. The follower block 82 has flanged rollers 132 supported in openings thereof with said rollers tracking on the two middle bars of the chute 80. The middle bars of the chute 80 are notched at 133 (Figure 10) just inside of the bead 81 to form pockets permitting the cup blanks to be pushed therein by the action of a resilient looped spring 134 supported on the top of the frame 68 to engage the cup blanks entering the frame 68. The notches 133 and the spring 134 permit the cup blanks to have relative sliding movement with respect to one another to thus become separated one from the other. The looped spring 134 also serves to prevent the cup blanks in the frame 68 packing against the lowermost blank which is in position ready to be removed from the frame 68. As illustrated in Figure 8, each cup blank 79 is provided with an integral reinforcing tab 83 of substantially semi-circular form separated from the blank at one portion by a slit 84.

As the cup blanks in the magazine 80 are fed downwardly by gravity, the lowermost blanks 79 are pushed into the centering frame 68 between resilient centering loops 84 secured to opposite sides of the centering frame 68. The lowermost blank 79 is thus moved into a vertical position against the stop beads 81 and against the side stop wires 131 and is thus properly centered and retained in place by the ends of said loops 84, as well as by the beads 81 and the wire stops 131.

A buckling mechanism is provided for the cup blanks and comprises a buckling cam or finger 85 secured to a pin 86 within the hood 67 of the centering frame. Fixed on one projecting end of the pin 86 is a crank arm 87 to the end of which one end of a rod 88 is pivotally connected. The other end of the rod 88 slidably projects through an opening in a stud 89 supported on the triple bell crank arm 61. A collar 90 is fixed on the end of the rod 88 to the outside of the stud 89 to permit operation of the buckling mechanism by the arm 61. A spring 135 is connected to the rod 88 and to the frame hood 67, Figure 4, to afford a means for releasing the buckling finger 85 immediately after a buckling operation.

A suction device is provided for removing blanks one at a time from the centering frame 68 and delivering the blanks upon the stationary table 17 against a stop 92. Also provided on the stationary table 17 is a pivoted stop arm 136 (Fig. 18) which is pivoted on a bracket 137 fastened underneath the table 17. A spring 138 connects the lower end of the pivoted stop arm 136 to a stationary bar 139 fixed beneath the table 17. The stop 136 is formed to project above one edge of the table 17 to one side of the stop 92 and serves to hold a blank on the table in proper position to be engaged by the gripping mechanism. The suction device embraces a housing or casing 93 having a face plate 94 provided with a pair of rectangular grooves 95 and a transverse groove 96. Each of the rectangular grooves 95 has communicating therewith a port 97 which also communicates with a longitudinal passage 98 in the casing 93. The ends of the passage 98 terminate in the face of the casing plate 94 within rectangular block portions 99 formed by the grooves 95 (Figure 11). The casing 93 is also provided with an angle passage 100, one end of which opens into the passage 98, while the other end opens into a transverse valve slot 101 formed in the casing 93. Also provided in the casing 93 is a passage 102, one end of which opens into the slot 101, while the other end connects with an air suction pipe 103. The suction pipe 103 may be connected with any suitable apparatus for producing the required suction. Slidable in the casing slot 101 is a valve block 104 having a U-shaped passage 105 therein, the ends of which are adapted to be moved into and out of register with the casing passages 100 and 102. Secured to the face of the casing plate 94 are two projecting leaf springs 141 (Figure 11). As illustrated in Figure 5, the spring 106 is provided to hold the valve block 104 slidably seated within the casing slot 101. The valve casing 93 has formed thereon a short arm 107 and a longer arm 108 disposed parallel to one another and pivotally engaged on the pin 76 carried by the carriage 75. The projecting end of the long arm 108 carries a pin and roller 109 which projects into a channel cam 110 formed on the inner face of a plate 111 which is rigidly secured to one side of the stationary plate 71. Rigidly secured to the under side of the top plate 71 near the centering frame 68 is a valve operating finger 112 adapted to cause the valve block 104 to slide into the position shown in Figures 4 and 13 to cause a suction effect at the ends of the casing passage 98 and in the casing plate grooves 95. A second valve operating finger 113 is secured to the support arm 65 in the path of the valve block 104 to cause movement of said valve block to the dotted line closed position of Figure 4 to cause breaking of the suction effect to release a cup blank.

Supported on the machine frame head 2 is a compressed air control valve 117 which is connected with a compressed air supply pipe 118 leading from any convenient source of compressed air. A regulating valve 119 is disposed in the supply pipe 118 above the control valve 117 and may be set at any desired point of adjustment to determine the amount of compressed air to be admitted into the control valve 117. The control valve 117 is provided with a projecting valve stem 120 adapted to be operated by a lifting member or arm 121 pivoted at 122 to a stationary support. The lifting arm 121 is adapted to be actuated at a predetermined time by a roller 123 mounted on the large gear 7 (Figure 1). When the roller 123 operates the arm 121 the valve stem 120 is pushed inwardly to open the control valve to permit a blast of compressed air to be discharged through a pipe 124 and through openings in the forming die 12 to blow a formed cup from said die at a predetermined time in a cup forming operation.

For the purpose of assisting in separating the cup blanks 79 within the frame 68 an air blast nozzle 114 is supported on the frame 68 with the tip of the nozzle positioned at the blank slits 84 and in front of the blank tabs 83, as illustrated in Figure 8. The nozzle 114 is fixed on the end of a pipe 115. The pipe 115 is connected with an air blast control valve 116 supported on the machine frame head 2 and connected with the compressed air supply pipe 118 above the regulating valve 119, as shown in Figure 3, by means of a pipe 125. A regulating valve 119[a] is provided in the pipe 125. The control valve 116 is provided with a valve stem 126 which is positioned to be operated by a pivoted arm 127 adapted to be actuated at a predetermined time by the roller 123 on the large gear 7 so that a blast of air is blown between the lowermost blanks 79 in the frame 68 at the slit portion of said blanks, thereby acting to separate the cup blanks to permit removal thereof one at a time from the centering frame.

As illustrated in Figures 4 and 8, a pin 140 is supported in an inclined position on the top of the blank centering frame hood 67. The end of the pin 140 is shaped to afford a cutting edge positioned to have the upper edge of the lowermost cup blank forced thereagainst so that as said lowermost blank is buckled the pin cuts through the edge thereof and presses against the next cup blank to prevent the same from being removed from the centering frame.

The operation is as follows:

The cup forming machine is adapted to be operated by a driving belt driven from any suitable source of power and adapted to be shifted from the idler pulley 4 onto the drive pulley 5 to cause rotation of the main drive shaft 3 and the gears 6 and 10 fixed thereon. The gear 10 is adapted to impart a drive to the shaft 11 on which the main cup forming die 12 is supported. The bevel gear 16 on the shaft 11 being in mesh with the bevel gear 14 acts to rotate the same together with the cup presser die 15. The cup forming dies 12 and 15 are separated at the beginning of a cup forming operation due to the action of the cam 9 on the pivoted support of the cup presser die 15. The teeth of the beveled gears 14 and 16 are of such a length that they are always in mesh even when the presser die 15 is swung upwardly away from the forming die 12. When the dies are rotating, a reciprocating motion is given to the slidable table 19 by means of the lever 21. The lever 21 is oscillated from the shaft 22 which is rocked back and forth by the crank arm 29 connected eccentrically by the link 30 to the gear 7 to receive a drive therefrom.

This invention relates more particularly to a cup forming machine blank feed attachment adapted to automatically feed cup blanks into the cup forming machine at predetermined intervals. Before the machine is started a stack of cup blanks 79 is deposited in the inclined rack or magazine 80, as illustrated in Figure 1, with the follower 82 disposed against the last blank. The follower 82 supported by the rollers 132 acts to cause the cup blanks to feed downwardly by gravity with the lowermost blanks engaged in the centering frame 68 between the resilient guide loops 84 and below the top spring loop 134. The slats comprising part of the magazine 80, together with the resilient centering members 84, serve to hold the cup blanks in a vertical centered position with the lowermost or end blank in position against the stop beads 81, and the stop wires 131, as shown in Figure 8, ready to be removed. The lowermost blank in the frame 68 also contacts the pin 140. As the cup blanks 79 are fed downwardly in the inclined chute 80, they have a tendency to frictionally move one over the other and thus become sufficiently loosened to permit said blanks, when reaching the frame 68, to drop down into the notches 133 (Figure 10) of the chute 80 due to the action of gravity in addition to the action of the upper presser spring 134, which not only pushes said blanks downwardly but also serves to prevent the blanks from packing tightly against the lowermost blank which is to be removed from the frame.

With the slidable table 19 in its innermost position the suction blank feed mechanism and the blank buckling mechanism are disposed in the dotted line positions of Figure 4 with the suction valve 104 moved into closed position by contact with the stationary finger 113. The valve 104 is closed to shut off the suction and to admit atmospheric pressure into the valve housing. As the slidable table 19 is retracted after advancing a blank between the forming dies, the lever 54 on the shaft 22 is swung downwardly, thereby actuating the connecting rod 53 and the toggle bar 50. The toggle bar 50, when actuated, acts to swing the bell crank 48 so that the rod 47 is pulled downwardly to swing the pivoted clamping or gripping jaw 43 into open position, as illustrated in Figure 7, to release the advanced cup blank. With the continued retraction of the slidable table 19 the bell crank 48 contacts the pin 49 on the lever 39 and thereby causes said lever and the open gripping mechanisms thereon to swing outwardly into the position illustrated in Figures 6 and 14 with the latch ball or pin 44 seated in the outermost notch 37 in the bar 36 to permit operation of the gripping mechanism before the operation of the lever 39, when the next feed operation starts.

While the slide table 19 is being retracted and the lever 39 swings outwardly the downward movement of the lever 54 causes the rod 55 to rotate the triple bell crank member from the dotted line position of Figure 4 toward the full line position shown in said figure. This operation causes the bell crank arm 62 to carry the suction mechanism inwardly with the pin or roller 109 tracking in the channel cam 110. The suction mechanism is accordingly swung into the full line position of Figure 4 with the casing plate 94 seated against the end cup blank 79 in the centering frame 68 of the blank holding magazine. As the suction mechanism is moved into the full line position of Figure 4, the projecting valve block 104 is moved into contact with the stationary finger 112. The valve block is thus pushed into open suction position, as shown in Figure 13, wherein the valve passage 105 is in register with the passages 100 and 102. The suction in the pipe 103 causes air to be drawn inwardly through the ends of the casing passage 98 and through the ports 97 and out through said air exhaust pipe 103. The suction thus produced at the suction casing plate 94 acts to automatically draw the end blank 79 against said casing plate.

While the suction operation is taking place the bell crank arm 61 has moved from the dotted line position of Figure 4 against the collar 90 on the rod 88, thereby pulling said rod 88 and causing the crank arm 87 to swing outwardly away from the centering frame 68. This operation of the crank arm 87 acts to move the buckling finger 85 downwardly against the upper portion of the cup blank to buckle said blank to separate it from the blank adjacent thereto. When the cup blank is buckled the upper edge of said blank is pulled down against the knife edge of the pin 140 so that said pin cuts through the edge of the blank and against the next cup blank to prevent more than one cup blank being buckled at a time. The end or lowermost cup blank in the frame 68 is thus attracted by the suction mechanism and buckled by the finger 85. At this stage in the operation the roller 123 on the gear 7 is brought into contact with the pivoted bar 127 which is moved to push the control valve stem 126 inwardly, thereby causing a blast of air to escape from the nozzle 114 and be blown behind the buckled portion of the buckled cup blank in the frame 68 to separate the same from an adjacent cup blank. The action of the spring 135 serves to release the buckling finger 85 almost immediately after a buckling operation.

As the slidable table 19 again starts to move inwardly the lever 54 pushes the rod 55 thereby actuating the triple arm bell crank, the arm 62 of which serves to slide the carriage 75 downwardly in the guide groove or slot 73, thus carrying the suction mechanism away from the centering frame 68 and removing the end cup blank from the magazine. As the carriage moves downwardly the roller 109 tracks in the channel cam 110 thereby causing the suction mechanism to move toward the dotted line position of Figure 4. The valve block 104 is thus moved against the stationary finger 113 which acts to slide said valve block 104 into closed position thereby shutting off the suction from the pipe 103 and admitting atmospheric pressure into the valve whereby the cup blank is released and drops upon the inclined stationary table 17 and slides against the stop 92, and against the pivoted stop arm 136, which acts to prevent the deposited cup blank from swinging or tipping after it has been released by the suction valve and slides down the inclined table 17 and contacts the stationary stop 92. The leaf springs 141 on the valve plate 94 act to assist in releasing a cup blank from the suction valve plate 94 when the suction action is discontinued and atmospheric pressure is admitted into the valve housing 93. As the suction mechanism moves toward a cup blank "A" in the frame 68, the gripping mechanism moves outwardly and acts to engage the pivoted stop 136 to trip the same as the gripping jaws engage over a previously deposited cup blank "B" on the table 17.

With the upward movement of the lever 54, the rod 53 and the link bar 50 first act on the bell crank 48 to cause the rod 47 to swing the lower pivoted gripper 43 into closed position to clamp the previously deposited cup blank "B" between the grippers 40 and 43. After this occurs the rod 53 acting with the link 52 and the gripper mechanism causes the lever 39 to swing inwardly thereby sliding the gripper mechanism out of the latched position of Fig. 14 longitudinally of the stationary table 17 to advance the blank "B" from the table 17 over the table 19. As soon as the gripping mechanism moves inwardly the spring 138 acts to return the stop 136 to stop position. While the cup blank "A" is being removed from the frame 68 the control spring 135 acts on the rod 88 to hold the collar 90 against the stud 89 thereby quickly swinging the buckling finger 85 upwardly into release position. While the cup blank "A" is being removed from the frame 68 and deposited on the table 17, the cup blank "B" is transferred from the stationary table 17 below the spring 129 on said stationary table. The spring 129 acts to seat said blank "B" ahead of the stop bar 128 on said stationary table to await the return of the slidable table 19 which at this time is delivering a third blank "C" between the forming dies. When the slidable table returns it slides beneath the advanced blank "B" until the recess 31 is moved slightly past said blank "B", at which time the spring 129 on the stationary table pushes the advanced blank "B" into said slidable table recess ready to be advanced or fed between the forming dies of the machine with the next inward movement of the slidable table 19. When the slidable table 19 is advanced the spring 129 on the stationary table 17 acts to retard the advance of the blank "B" until the edge of the recess 31 contacts the blank and advances the same. The blank "B" is thus properly seated in the recess 31 and against the stop 32.

As the advance end of the cup blank "B" is projected between the separated forming dies 12 and 15, the cam 9 on the machine permits the presser die 15 to be lowered so that the said presser die acts to clamp the advance portion of the cup blank "B" between said forming dies. The cup blank "B" being engaged between the forming dies, a paper cup is automatically formed by said dies and then blown from the forming die 12 by the air discharge mechanism which is controlled by the valve 117, the valve stem 120 of which is actuated by the arm 121 and the roller 123 on the gear 7.

The cycle of operations may be repeated as often as desired to permit cup blanks 79 from the gravity feed magazine 80 to be first centered in the centering frame 68 and then automatically removed from said frame by the suction mechanism and the buckling device together with the air blast mechanism. The removed cup blanks are automatically transferred onto the stationary table 17 against the stop 92 and the stop 136, from which position the gripping device is brought into action to automatically feed the cup blanks across the stationary table onto the reciprocating feed table 19 to be delivered between the cup forming dies of the machine. When the machine is in operation there are four cup blanks disposed in different positions in the machine. That is while a cup is being discharged from the forming die, a second cup blank is being fed forwardly between the forming dies by the slidable table 19, and a third blank is transferred by the gripping mechanism from the stationary table 17 under the spring 129 and in advance of the stop 128, as the fourth blank is being removed from the magazine and delivered to the stationary table 17.

I am aware that numerous details of construction may be varied through a wide range without departing from the principles of this invention, and I therefore do not purpose limiting the patent granted otherwise than necessitated by the prior art.

I claim as my invention:

1. The combination with a cup forming machine, of a stationary table, a movable table, a shaft adapted to be reciprocated by the machine, a lever mechanism connected with the movable table and operable by said shaft for reciprocating the movable table, a second lever mechanism operable by said shaft, and a cup blank feeding attachment mounted on the machine adapted to be operated by said second lever mechanism.

2. The combination with a cup forming machine, of a stationary table, a movable table, a shaft adapted to be reciprocated by the machine, a lever mechanism connected with the movable table and operable by said shaft for reciprocating the movable table, a second lever mechanism operable by said shaft, a cup blank feeding attachment mounted on the machine adapted to be operated by said second lever mechanism to feed cup blanks onto said stationary table, and a cup blank gripping mechanism connected to be operated by said second lever mechanism for gripping the cup blanks on said stationary table and transferring said cup blanks to said reciprocating table.

3. The combination with a cup forming machine, of a stationary table, a movable table, a shaft connected to be reciprocated from the machine, means on said shaft for reciprocating the movable table, a lever fixed on said shaft, a cup blank magazine, and mechanisms operated by said lever for delivering a cup blank from said magazine to said stationary table and then transferring said cup blank from said stationary table to said reciprocating table to be fed into the machine.

4. The combination with a cup forming machine, of a stationary table, a movable table, a shaft connected to be reciprocated from the machine, means on said shaft for reciprocating the movable table, a lever fixed on said shaft, a cup blank magazine, a mechanism operated by the lever for removing cup blanks from said magazine and depositing said cup blanks on said stationary table, and means operated by said lever for transferring the cup blanks from said stationary table onto said movable table to be fed into the machine.

5. The combination with a cup forming machine, of a stationary table, a movable table, a shaft connected to be reciprocated by the machine, means on said shaft for reciprocating the movable table, a lever fixed on said shaft to be reciprocated thereby, a cup blank magazine, a mechanism operated by the lever for removing a cup blank from said magazine and depositing said cup blank on said stationary table, an arm pivoted on the machine, gripping means thereon, and mechanisms connecting said lever with said arm and with said gripping means to permit the cup blank on said stationary table to be gripped and then transferred from said stationary table onto said movable table to be fed into the machine.

6. The combination with a cup forming machine, of a stationary table, a movable table, a shaft connected to be partially rotated in opposite directions by the machine, means on said shaft for reciprocating the movable table, a lever fixed on said shaft, a cup blank magazine, means operated by said lever for removing a cup blank from said magazine and depositing said cup blank on said stationary table, an arm pivoted on the machine, a gripping device on said arm, a bell crank pivoted on said arm and connected to said gripping device, and toggle members connecting said arm and said bell crank to said lever to permit the cup blank on said stationary table to be gripped by said gripping device and then transferred by said arm from said stationary table onto said movable table to be fed into the machine.

7. The combination with a cup forming machine, of a stationary table, a movable table, a shaft adapted to be reciprocated by the machine, means on said shaft for reciprocating the movable table, a lever fixed on said shaft, a cup blank magazine, a bell crank mechanism pivotally mounted on the machine and operable by said lever, a cup blank removing device operated by said bell crank for removing a cup blank from said magazine and depositing said cup blank on said stationary table, and means operated by said lever for transferring the cup blank from said stationary table onto said movable table to be fed into the machine.

8. The combination with a cup forming machine, of a stationary table, a movable table, a shaft connected to be reciprocated by the machine, means operated by the shaft for reciprocating the movable table, a lever fixed on said shaft, a cup blank holder, a bell crank pivoted on the machine adapted to be operated by said lever, a buckling mechanism operated by the bell crank to buckle a cup blank in said holder, a cup blank removing device operated by said bell crank for removing a buckled cup blank from said holder and delivering said cup blank onto said stationary table, and a gripper mechanism on the machine operable by said lever for transferring the cup blank from said stationary table onto said movable table to be fed into the machine.

9. The combination with a cup forming machine, of a blank holding magazine thereon, a bell crank device connected to be operated by the machine, and a cup blank buckling mechanism and a cup blank removing mechanism connected to be operated by the bell crank device to feed a cup blank from said magazine to the machine.

10. The combination with a cup forming machine, of a stationary table, a cup blank holding magazine mounted on the machine, a pivoted member connected to be operated by the machine, and a plurality of mechanisms operated by said pivoted member to first attract and buckle a cup blank in said magazine and then deliver said cup blank onto said stationary table.

11. The combination with a cup forming machine, of a reciprocating table forming a part thereof, a shaft rotatable alternately in opposite directions by the machine, a cup blank feed mechanism on the machine, and a plurality of levers operated by said shaft for reciprocating said table and operating said cup blank feed mechanism.

12. The combination with a cup forming machine, of a cup blank feed mechanism, a shaft adapted to be reciprocated by the machine, and means connecting said shaft with said cup blank feed mechanism to operate the same.

13. The combination with a cup forming machine, of a cup blank feed mechanism supported on the machine, a shaft supported on the machine connected to be reciprocated thereby, a lever fixed on said shaft, and means connecting said lever with said cup blank feed mechanism to operate the same.

14. The combination with a cup forming machine, of a shaft supported thereon and reciprocated thereby, a lever fixed on said shaft, a bell crank pivotally supported on the machine, a rod pivotally connected to said lever and to said bell crank, a cup blank magazine on said machine, cup blank transfer means operable by said bell crank for removing cup blanks from said magazine, and a cup blank buckling mechanism also operated by said bell crank for buckling the cup blanks previous to the removal thereof from said magazine.

15. The combination with a cup forming machine, of a shaft supported thereon and reciprocated thereby, a lever fixed on said shaft, a three arm member pivotally supported on the machine, a rod pivotally connected to said lever and to one arm of said three arm member to reciprocate the same, a cup blank magazine supported on the machine, a cup blank buckling mechanism connected to be operated by a second arm of said three arm member, a cup blank suction device operable by the third arm of said three arm member to remove cup blanks from said magazine, and a cam guide for said cup blank suction device.

16. The combination with a cup forming machine, of a shaft supported thereon and reciprocated thereby, a lever fixed on said shaft, a bell crank pivoted on the machine, means connecting said bell crank with said lever to receive a drive therefrom, a cup blank magazine on said machine, and a cup blank buckling mechanism connected to be operated by said bell crank to cause buckling of the cup blanks in said magazine.

17. The combination with a cup forming machine, of a shaft supported thereon and reciprocated thereby, a lever fixed on said shaft, a bell crank pivoted on the machine, means connecting said bell crank with said lever to receive a drive therefrom, a cup blank magazine supported on the machine, and a suction mechanism connected to be operated by said bell crank to remove cup blanks from the magazine.

18. The combination with a cup forming machine, of a shaft supported thereon and reciprocated thereby, a lever fixed on said shaft, a bell crank pivoted on the machine, means connecting said bell crank with said lever to receive a drive therefrom, a cup blank magazine supported on the machine, a suction mechanism connected to be operated by said bell crank to remove cup blanks from the magazine, and a cam guide for said suction mechanism to control the path of movement of said suction mechanism.

19. The combination with a cup forming machine, of a shaft supported thereon and reciprocated thereby, a lever fixed on said shaft, a bell crank pivoted on the machine, means connecting said bell crank with said lever to receive a drive therefrom, a cup blank magazine supported on the machine, a carriage connected with said bell crank to be reciprocated thereby, a suction mechanism pivotally supported on said carriage for removing cup blanks from said magazine, a cam guide for controlling the path of movement of said suction mechanism, and means for controlling the suction mechanism to permit the same to attract and release cup blanks.

20. The combination with a cup forming machine, of a table thereon, a cup blank centering frame supported on said table, a gravity feed cup blank magazine connected with said centering frame to automatically feed cup blanks thereto, and mechanisms operated from the machine for removing cup blanks from said centering frame and delivering said cup blanks to said table.

21. The combination with a cup forming machine, of a cup blank gravity feed magazine supported on the machine, and pivotally mounted mechanisms operated from the machine for automatically removing cup blanks from said magazine and then swinging the cup blanks into a position to deliver the same into said machine.

22. The combination with a cup forming machine, of a cup blank centering frame supported on the machine, a gravity feed cup blank magazine connected with said frame to supply cup blanks thereto, a pivoted suction mechanism operated from the machine for removing cup blanks from said frame and then swinging the removed cup blanks into a discharge position, and gripper mechanisms operable from the machine for delivering the removed cup blanks into the machine.

23. The combination with a cup forming machine, of a frame supported on the machine, a gravity feed cup blank magazine connected with said frame to supply cup blanks thereto, resilient guide members on said frame for centering the cup blanks fed thereto, a suction mechanism operated from the machine for removing cup blanks from said frame one at a time, a valve forming a part of said suction mechanism, stationary members on the machine for opening and closing said valve to cause cup blanks to be attracted by said suction mechanism, and then released, and mechanisms operable from the machine for delivering the released cup blanks into the machine.

24. The combination with a cup forming machine, of a frame supported on the machine, a gravity feed cup blank magazine connected with said frame to supply cup blanks thereto, resilient looped members secured to said frame for centering the cup blanks fed thereto and a cup blank buckling mechanism mounted in said frame and operable from the machine to cause buckling of the centered cup blanks.

25. The combination with a cup forming machine, of a frame supported thereon, an inclined magazine connected with said frame for holding a stack of cup blanks, a follower in said magazine to cause said cup blanks to be fed into said frame by gravity, means on said frame for centering the cup blanks fed thereto, a suction mechanism operated from the machine for removing cup blanks from said frame, a cam guide for said suction mechanism to control the path of movement thereof, a valve forming a part of said suction mechanism, a stationary member on the machine against which the valve is adapted to be contacted to cause opening of the valve to cause cup blanks to be removed by suction from said frame, and another stationary member on the machine for closing said valve to cause release of the cup blanks after having been removed from the frame and carried through a predetermined path.

26. The combination with a cup forming machine, of a frame supported thereon, a cup blank magazine connected with said frame for feeding cup blanks thereto, means on said frame for centering the cup blanks fed thereto, a bracket secured to said frame and to said machine having a guide groove therein, a carriage slidable in said guide groove, a suction mechanism pivotally supported on said carriage and operable from the machine for removing cup blanks from said frame, a cam guide for said suction mechanism to control the path of movement thereof, a suction control valve forming a part of said suction mechanism, and means on said bracket for operating said valve.

27. The combination with a cup forming machine, of a stationary table, a movable table, a shaft supported on the machine and operated thereby, means on said shaft for reciprocating the movable table, a lever operated by said shaft, means operated by said lever for delivering cup blanks to said stationary table, a rod having one end thereof connected to said lever, an arm pivoted on said machine, a link pivotally connected to said rod and to said arm, a bell crank pivoted on said arm, a second link pivotally connected to said bell crank and to said rod, a cup blank gripper mechanism on said arm for transferring the cup blanks from said stationary table to said movable table when said arm is reciprocated, and a rod connected with said bell crank and with said gripper mechanism.

28. The combination with a cup forming machine, of a bar forming a part thereof having stop notches therein, an arm pivotally mounted on said machine, a spring on said arm frictionally engaging one side of said bar, a ball projecting through said arm against said bar, a spring on the other side of said arm contacting said ball, a cup blank gripper member integrally formed on said arm, another cup blank gripper member pivotally supported on said arm for coaction with said first mentioned gripper member, and means operated from the machine for reciprocating said arm and operating said pivoted gripper member.

29. The combination with a cup forming machine and the reciprocating table thereof, of a cup blank feed attachment supported on the machine, a shaft operated by the machine, and mechanisms operated by the shaft for actuating said table and said cup blank feed attachment.

30. The combination with a cup forming machine, of a blank feeding attachment connected to be operated from the machine and comprising a gravity cup blank feed device, a slidable carriage operated from the machine, means pivotally supported on the carriage for automatically removing cup blanks from said feed device, a stationary cam for controlling the movement of said pivoted means, and means for transferring the removed cup blanks into the machine.

31. The combination with a cup forming machine, of a blank feeding attachment connected to be operated from the machine and comprising a gravity cup blank feed device, mechanisms for automatically buckling and removing cup blanks from said gravity feed device, a movable stop against which cup blanks are adapted to engage, and means for moving the movable stop out of the way and then delivering the cup blanks into the machine.

32. The combination with a cup forming machine, of a gravity cup blank feed attachment therefor, a movable stop on the machine, means operated by the machine for automatically drawing cup blanks from said gravity feed attachment and delivering the cup blanks against said movable stop, and gripper means operated from the machine for first moving the movable stop out of the way and then feeding the blanks into the machine.

33. The combination with a cup forming machine, of a gravity cup blank feed attachment thereon, means for automatically separating the cup blanks in said feed attachment, a mechanism operated by the machine for automatically buckling a cup blank in said blank feed attachment, a pivoted device for drawing the buckled cup blank from the gravity feed attachment and delivering the same into the machine, and a bell-crank operated from the machine and connected to said buckling mechanism and to said pivoted device to actuate the same.

34. A cup forming machine blank feeding attachment comprising a gravity feed device, a cam controlled pivotally mounted suction means for drawing blanks from the lower end thereof and transferring the removed cup blanks into a discharged position, a control valve carried by said suction means, and stationary means for operating the control valve to cause release of the cup blanks.

35. A cup blank feeding attachment comprising a gravity feed blank holding magazine, a cup blank centering frame secured thereto, pivoted means for automatically removing cup blanks from said frame, a slidable carriage supporting said means, and cam means for governing the movement of the pivoted means.

36. A cup blank feeding attachment comprising a gravity feed blank holding magazine, means for automatically removing cup blanks therefrom, and stationary cam means for guiding the movement of said blank removing means.

37. A cup blank feeding attachment comprising a gravity feed blank holding magazine, a cup blank centering frame thereon, a grooved bracket secured to said frame, a carriage slidable therein, means for operating said carriage, and a mechanism supported on said carriage for automatically drawing cup blanks from said frame.

38. A cup blank feeding attachment comprising a gravity feed blank holding magazine, a slidable carriage, means for operating the same, and a suction device pivotally supported on said carriage adapted to remove a cup blank from said magazine and then swing the cup blank into a release position.

39. A cup blank feeding attachment comprising a gravity feed blank holding magazine, a stationary support, a carriage slidable thereon, a table below said support, means for operating the carriage, a release member on said support, and a suction device pivotally supported on said carriage adapted to remove a cup blank from said magazine and then swing into contact with said release member to cause the cup blank to be released to drop on said table.

40. A cup blank feed attachment comprising a gravity feed blank holding magazine, a cup blank centering frame thereon into which the cup blanks feed, a buckling finger pivoted in said frame, a crank arm connected therewith, a rod pivotally connected to said crank arm, and means for operating the rod to cause said buckling finger to engage and buckle a cup blank in said frame.

41. A cup blank feed attachment comprising a gravity feed blank holding magazine, a centering frame thereon, a cup blank buckling device on said frame, a rod connected therewith, a collar on said rod, and means slidably engaged on said rod for operating said buckling device to buckle a cup blank in said frame.

42. A cup blank feed device comprising a frame, means for feeding cup blanks thereto by gravity, cup blank centering means on said frame, a table, stops thereon, means for attracting a cup blank in said frame, a carriage supporting said means, a mechanism for buckling the attracted cup blank while in said frame, and means for operating the buckling mechanism and said carriage to cause the cup blank attracting means to deliver the cup blank from said frame onto said table and against said stops.

43. A cup blank feed device comprising a frame, means for feeding cup blanks thereto, a slidable carriage, means for operating the same, a passaged casing pivotally supported on said carriage, a suction device connected with said casing, a valve on said casing for controlling the suction action of said suction device, and means for operating said valve to cause a cup blank in said frame to be attracted to said casing and removed from said frame by the operation of said carriage.

44. A blank feeding attachment comprising a gravity feed cup blank magazine, means for causing separation of the cup blanks in said magazine, mechanisms for buckling and drawing the lowermost cup blank from said magazine, and a bell crank device for operating said mechanisms in a consecutive predetermined order.

45. A blank feeding attachment comprising a gravity feed device for cup blanks, means for causing separation of the cup blanks, a valve controlled means for attracting a cup blank from said device, and a channel cam to cause said valve controlled means to swing through a predetermined path when the cup blank is removed from the gravity feed device.

46. A blank feeding attachment comprising a blank support, means for attracting a cup blank thereto, a valve controlling said means, a roller on said means, and a stationary cam channel to guide said roller in a predetermined path to cause raising and lowering of said means.

47. The combination with a cup forming machine, of a stationary table, a stationary blank stop thereon, a movable blank stop on said stationary table, a movable table, a shaft connected to be reciprocated from the machine, means on said shaft for reciprocating the movable table, a lever fixed on said shaft, a cup blank magazine, a mechanism operated by the lever for removing cup blanks from said magazine and depositing said cup blanks on said stationary table against said stationary stop and said movable stop, and means operated by said lever for tripping the movable stop and then gripping and transferring the cup blanks from said stationary table onto said movable table to be fed into the machine.

48. The combination with a cup forming machine, of a stationary table, a fixed blank stop and a pivoted blank stop on said stationary table, a cup blank holding magazine mounted on the machine, a pivoted member connected to be operated by the machine, and a plurality of mechanisms operated by said pivoted member to first attract and buckle a cup blank in said magazine and then deliver said cup blank onto said stationary table against said stationary stop and said pivoted stop.

49. The combination with a cup forming machine, of a cup blank holder, a table, a pivoted blank stop on said table, means operated by the machine for automatically removing a cup blank from said holder and delivering said cup blank onto said table against said pivoted stop, and transfer means operated by the machine for first tripping the pivoted stop and gripping the cup blank and then transferring the cup blank into the machine.

50. The combination with a cup forming machine, of a shaft supported thereon and reciprocated thereby, a lever fixed on said shaft, a three arm member pivotally supported on the machine, a rod pivotally connected to said lever and to one arm of said three arm member to reciprocate the same, a cup blank magazine supported on the machine, a cup blank buckling mechanism, a rod slidably connected with the second arm of said three arm member to cause operation of said buckling mechanism, and a cup blank suction device operable by the third arm of said three arm member to remove cup blanks from said magazine.

51. The combination with a cup forming machine, of a shaft supported thereon and reciprocated thereby, a lever fixed on said shaft, a bell crank pivoted on the machine, means connecting one arm of said bell crank with said lever to receive a drive therefrom, a cup blank magazine on said machine, a cup blank buckling mechanism, means connecting the buckling mechanism with another arm of said bell crank to permit the buckling mechanism to be operated by the bell crank to cause buckling of a cup blank in said magazine, and means for automatically releasing the buckling mechanism after a buckling operation.

52. The combination with a cup forming machine, of a shaft supported thereon and reciprocated thereby, a lever fixed on said shaft, a bell crank pivoted on the machine, means connecting said bell crank with said lever to receive a drive therefrom, a cup blank magazine supported on the machine, a stationary guide member, a carriage slidably supported thereon, means connecting said carriage with said bell crank to permit said carriage to be reciprocated, a suction mechanism supported on said carriage for removing cup blanks from said magazine, a cam guide, a roller on said suction mechanism adapted to track in said cam guide to govern the path of movement of said suction mechanism, and stationary members mounted on the machine for operating the suction mechanism to permit the same to attract and then release cup blanks.

53. The combination with a cup forming machine, of a table thereon, a cup blank centering frame supporting on said table, a gravity feed cup blank magazine connected with said centering frame to automatically feed cup blanks into said centering frame, and resilient means on said centering frame to engage the cup blanks entering said centering frame to hold said cup blanks from packing one against the other.

54. The combination with a cup forming machine, of a frame supported on the machine, a gravity feed cup blank magazine connected with said frame to supply cup blanks thereto, stops in said frame against which the cup blanks are adapted to engage, resilient members on said frame to guide the cup blanks into said frame, and resilient means on said frame to engage the cup blanks entering the frame to keep said cup blanks from packing tightly one against another.

55. The combination with a cup forming machine, of a frame supported on the machine, a cup blank magazine connected with said frame to supply cup blanks thereto, means operated from the machine for buckling a cup blank in said frame, and a mechanism operated by the machine adapted to direct a blast of air behind the buckled blank to separate said buckled blank from an adjacent blank in said frame.

56. The combination with a cup forming machine, of a gravity cup blank feed attachment thereon, a plurality of stops on said feed attachment against which a cup blank is adapted to contact, and means operated by the machine for automatically drawing said cup blank from said gravity feed attachment against the resistance of said stops.

57. A blank feeding attachment comprising a gravity feed cup blank magazine, means for holding the cup blanks from packing against one another, mechanisms for buckling and drawing the lowermost cup blank from said magazine, and means for blowing a blast of air behind the cup blank when buckled to assist in separating said cup blank from an adjacent cup blank.

58. The combination with a cup blank feed attachment, of a frame, a cup blank magazine connected therewith for holding a plurality of cup blanks, a follower block in said magazine behind said cup blanks to cause the cup blanks to be fed by gravity into said frame, resilient guide members on the sides of said frame to center the cup blanks entering the frame, stop beads and stop pins in said frame against which the lowermost cup blank is adapted to seat, a pin on said frame adapted to contact said lowermost cup blank, and a resilient member mounted on said frame for holding the cup blanks from packing against the lowermost cup blank in said frame.

59. In a cup forming machine, a table, a stop movably mounted thereon, a cup blank holder, means operated from the machine for transferring a cup blank from said holder onto said table against said stop, and a transfer means operated by the machine for tripping said movable stop and then transferring the cup blank from said table into the machine.

60. In a cup forming machine, a table, a cup blank holder mounted thereon, a plurality of stops on said holder against which a cup blank is adapted to engage, a pin on said holder also adapted to be engaged by said cup blank, and means operated by the machine adapted to draw the cup blank from said holder against the resistance of said stops and over said pin to permit the pin to cut the edge of the cup blank, said stops and pin positioned to be contacted by the next cup blank in said holder to permit only one cup blank to be removed at a time from the holder.

61. The combination with a cup blank holding magazine, of cup blank centering means thereon, a cup blank buckling device supported on the magazine, a spring controlled rod connected therewith to operate the same to cause buckling of a cup blank in said magazine, and a bell-crank for operating said spring controlled rod.

62. The combination with a blank holding magazine, of a stationary member having a cam slot therein, a movable carriage, a frame pivotally supported thereon and carrying a roller adapted to track in said cam slot, and a cup blank removing device carried by said pivoted frame for removing cup blanks from said magazine.

In testimony whereof I have hereunto subscribed my name.

RUDOLPH HOLMAN.